United States Patent [19]

Bruckhoff

[11] Patent Number: 4,498,332
[45] Date of Patent: Feb. 12, 1985

[54] TEST DEVICE FOR MEASURING THE FIT OF HEARING AID RELATED DEVICES

[75] Inventor: Henning Bruckhoff, Lister Meile 23, 3000 Hannover 1, Fed. Rep. of Germany

[73] Assignees: Siemens Aktiengesellschaft, Berlin and Munich; Henning Bruckhoff, Hannover, both of Fed. Rep. of Germany

[21] Appl. No.: 543,183

[22] Filed: Oct. 18, 1983

[30] Foreign Application Priority Data

Oct. 20, 1982 [DE] Fed. Rep. of Germany ....... 3239227

[51] Int. Cl.³ .......................... G01M 3/00; A61F 1/18
[52] U.S. Cl. ........................................ 73/40; 128/746; 179/107 E
[58] Field of Search ........................ 381/60; 128/746; 179/107 E; 73/40, 37.5; 181/130, 135

[56] References Cited

U.S. PATENT DOCUMENTS 4,412,096 10/1983 Edgerton et al. ................. 181/130

FOREIGN PATENT DOCUMENTS 2941817 4/1981 Fed. Rep. of Germany ...... 128/746

Primary Examiner—S. Clement Swisher
Assistant Examiner—Hezron E. Williams
Attorney, Agent, or Firm—Karl F. Milde, Jr.

[57] ABSTRACT

A measuring device for checking the tightness of an ear impression mold serving as pattern for the production of an otoplastic and/or of an otoplastic inserted in the auditory passage of an ear through which an air pressure deviating from the air pressure prevailing on the outside can be produced, via an air permeable connection, in the inner space defined by the ear drum and the ear impression or otoplastic. Through the device changes in the generated deviating air pressure can be measured. The air permeable connection is connected to a pump serving for the generation of the deviating air pressure via a pressure chamber whose volume is a multiple of the volume of the inner ear space. A control circuit presetting the timing of the pumping and measuring process is provided. The device is insensitive to differences in the volume of the inner ear space and produces reproducible test results which reliably indicate the quality of the ear impression of otoplastic.

8 Claims, 10 Drawing Figures

TO FIG 2

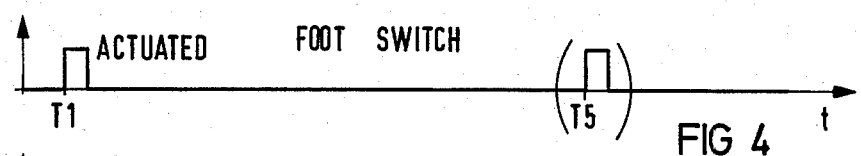
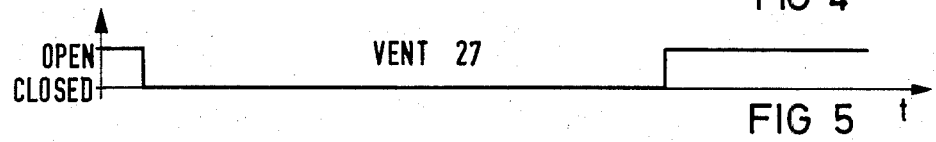
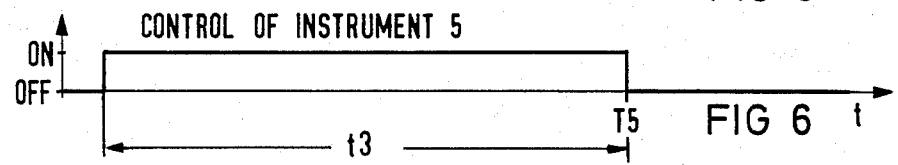
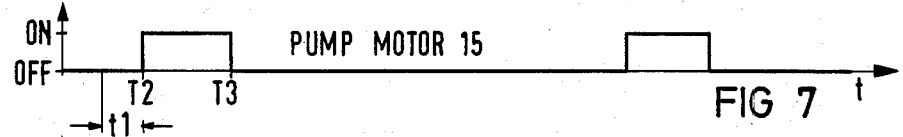
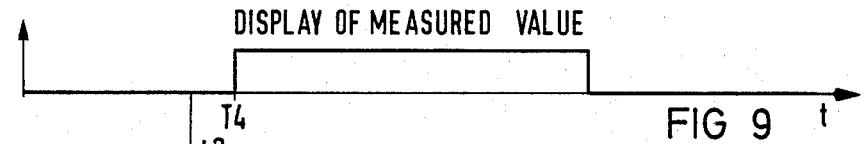
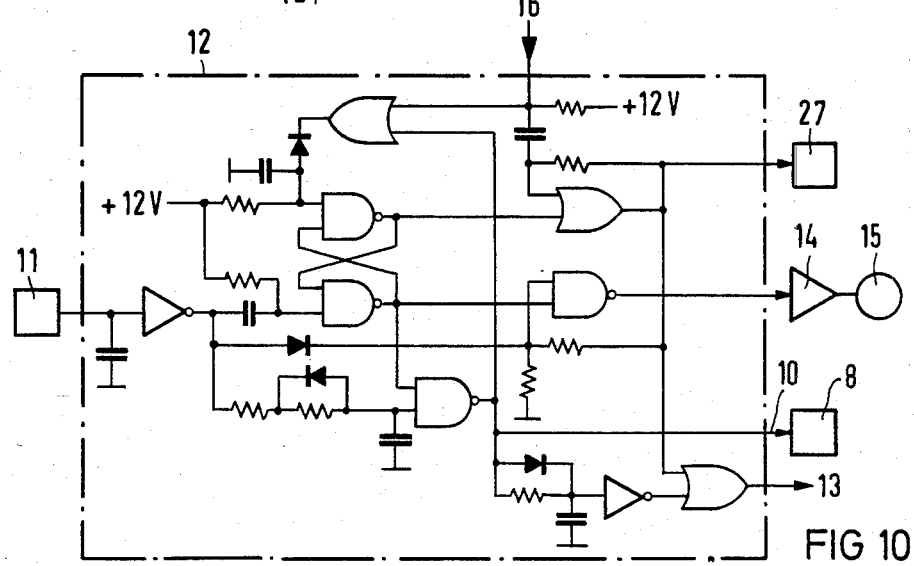

TEST DEVICE FOR MEASURING THE FIT OF HEARING AID RELATED DEVICES

BACKGROUND OF THE INVENTION

The present invention relates to a hearing aid test apparatus and, in particular, to a measuring device for checking the tightness or fit of an ear impression mold or of an otoplastic which is insertable into the auditory passage of an ear.

To compensate for hearing loss, persons hard of hearing have been using many varied kinds of hearing aids. Regardless of the specific design of the hearing aids, they all have in common the feature that sound must always be conducted into the ear when hearing rectification is by air conduction as is usually the case. Towards this end a so called otoplastic is inserted into the auditory passage which is completely adapted to the contour of the auditory passage and should fit in a sealing fashion. The sound is conducted from the hearing aid to the ear drum through an air duct in the otoplastic, and it must have no opportunity of reaching the outside through leaky points. For, if the seal is not complete, it is very easy for an acoustic feedback to occur which results in that sound escaping through the leak reaches the hearing aid microphone where it is amplified and reenters the air duct to the ear drum and again escapes to the outside to the microphone thereby generating oscillations audible as a shrill, disagreeable noise. Moreover, if the otoplastic does not fit the auditory passage exactly, the leaky points lead to distortions in the frequency response of the device.

The above discussion indicates that the manufacturing of the otoplastic is of decisive importance. Usually, the so called "positive-negative-positive method" is employed, in which an ear impression is made first, using a compound which is placed into the auditory passage. The compound solidifies after a short while, whereupon a negative can be produced from the impression (positive). For this purpose the impression is embedded in plaster of Paris or plastic material and taken out of it again after the material in which it is embedded has hardened. There now remains a mold corresponding to the ear impression which can now be filled with plastic in various ways. A copy of the ear impression true to the original, i.e. the otoplastic, is obtained in this manner, and if the manufacturing method was precise, it will fit the auditory passage exactly without leaving leaky points. Lastly, a hole for a sound tube is provided in the otoplastic so that the sound can be conducted through this tube from the hearing aid to the ear drum.

Unfortunately, the manufacture of the otoplastic does not always proceed without problems, and it happens that the finished otoplastic often does not fit the auditory passage exactly, thus not assuring the required complete seal. Two factors contribute to the fitting problem of the hearing aid. On the one hand, the ear impression mold may be inexact, e.g. due to the inclusion of air bubbles or due to the shrinkage of the impression material, and on the other hand errors can be made during the manufacture of the otoplastic itself, even if the ear impression serving as a pattern is correct. In the past there were no means of finding the actual source of error when the otoplastic did not seal properly. While checking of the ear impression mold was not possible at all, checking the otoplastic was restricted to a subjective check by questioning the hearing impaired person and examining the device for fit and feedback. If the otoplastic was found defective, the only thing left to do was to repeat the manufacturing process in the hope that the new one will fit the auditory passage exactly.

In German patent application DE-OS No. 2 941 817.5 is described a test method which makes it possible to determine the excellence and quality of an ear impression or of an otoplastic. This method provides for the generation, in the inner space defined by the ear drum and the ear impression or otoplastic, of an air pressure deviating from the air pressure prevailing on the outside via an air permeable connection from the inner space of the ear to the outside. A test is then made to determine whether the pressure remains stable or decreases, the rate at which the pressure changes being determinable by a measuring instrument, giving direct information on the quality and usability of the ear impression.

However, actual construction of such a measuring instrument encounters difficulties because only a very slight pressure of a maximum of about 20 mbar may be applied to the inner ear which has a volume of only about 2 cm$^3$, a small value which renders the task difficult. If a very slight overpressure is applied directly to the inner ear space, variations from the average volume of the auditory passage, which naturally is not the same in all people, will occur and lead to erroneous test results. The measuring inaccuracies are particularly great in the case of surgically enlarged auditory passages i.e. "radikalhoehlen". Also, the slight overpressure in the small volume fades very quickly even if the leaks are minor, thus rendering a reliable measurement more difficult.

Accordingly, the invention relates to a measuring device to test the tightness of an ear impression serving as pattern for the production of an otoplastic and/or an otoplastic inserted in the auditory passage of an ear, by means of which an air pressure deviating from the air passage prevailing on the outside can be produced, via an air permeable connection, in the inner space defined by the ear drum and the ear impression or the otoplastic, and by means of which changes in the generated deviating air pressure can be measured.

SUMMARY OF THE INVENTION

It is an object of the present invention to provide a measuring device which is characterized by its high measuring accuracy and insensitivity to volume differences of the inner ear space and which furnishes a reproducible indication of the quality and usability of the ear impression mold or otoplastic.

The foregoing problems associated with the manufacturing of hearing aids are solved in accordance with one embodiment of the present invention by providing an improved measuring device for checking the tightness of an ear impression mold or of an otoplastic. Essentially, in a measuring device for checking the tightness of an ear impression mold which serves as a pattern for the manufacture of an otoplastic and/or of an otoplastic which is insertable in the auditory passage of an ear, in which by means of the measuring device an ear pressure prevailing on the outside can be produced, via an air permeable connection, in an inner space defined by the ear drum and the ear impression mold or the otoplastic and through which changes in a generated deviating ear pressure can be measured, the following improvements are included. A pump is included which is connected to the air permeable connection which serves for the generation of the deviating air pressure via a pressure chamber with a volume which is a multiple of the volume of the inner ear space; and a control circuit is also included for presetting the timing of pumping and measuring functions which are instrumental in determining the functional integrity of the fit of the hearing aid.

In a preferred embodiment, the pump is a piston pump with a displacement which corresponds to approximately to the volume of the inner space of the ear and which includes a pressure chamber which is approximately 20 to 100 times the volume of the inner space of the ear. The small ear volume of the inner ear is thus increased substantially through the relatively large pressure chamber so that measuring inaccuracies are avoided even in the case of surgically enlarged auditory passages i.e. "radikalhoehlen". The relatively large pressure chamber also causes differences in volume of the inner ear space to have a correspondingly lesser effect. In addition, due to the greater ear volume the overpressure in the event of a leak can be relieved slowly so that a reliable indication is provided.

The overpressure generated is so small that the atmospheric ear pressure at high elevations effects the test results. To prevent this, the pressure chamber volume is made adjustable, in a further preferred embodiment of the present invention, to adapt it to the atmospheric pressure at the test site. This is preferably accomplished by a piston which can be pushed into the pressure chamber to reduce the latters volume in accordance with the location of the measuring device above sea level.

In yet another preferred embodiment of the invention the measuring device is characterized in that with the triggering of a pumping function the control circuit drives a recording measuring instrument which plots the instantaneous pressure over time for each piston stroke and provides a maximum value which is a measure of the diameter of an air leak if any and a second value corresponding to a preset later point in time which is a measure of pressure then still remaining, in a scale from 100 to zero, 100 corresponding to a state of complete tightness. The recording measuring instrument may comprise an analog indicating device for generating the maximum value and a digital display for generating the second value. Preferably, the analog indicating device and the digital display may be provided in addition to a recording measuring instrument which provides the plots of the instantaneous pressure over time for each piston stroke.

Other features and advantages of the invention will be apparent from the following description of preferred embodiments, and from the claims.

For a full understanding of the present invention, reference should now be made to the following detailed description of the preferred embodiments of the invention and to the accompanying drawings.

BRIEF DESCRIPTION OF THE DRAWINGS

FIGS. 4 through 9 are timing diagrams relevant to the operation of the test device.

FIG. 10 shows a preferred embodiment for a control circuit which is shown in block form in FIG. 2.

DETAILED DESCRIPTION

Figure 1:
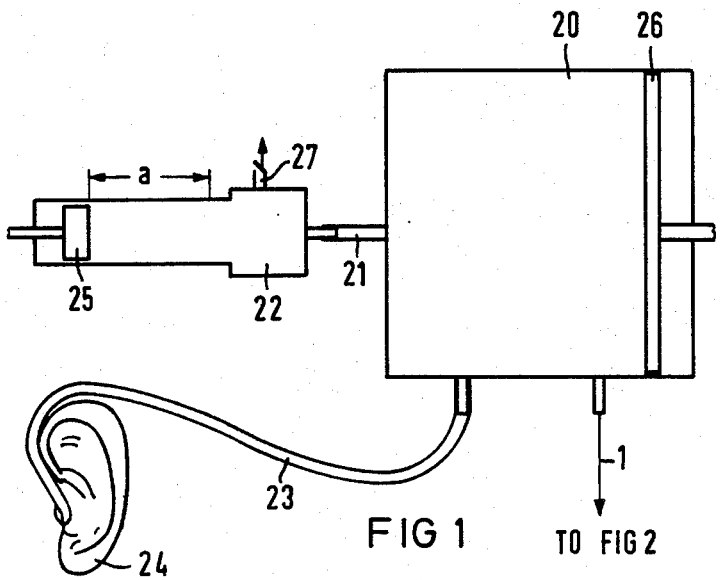
FIG. 1 shows an arrangement, in schematic format, for the generation of an overpressure in the inner ear space.

In FIG. 1, a pressure chamber 20 is connected, on the one hand, to an electric piston pump 22 via a nipple 21 and on the other hand to an otoplastic or an ear impression via a tube 23, the ear impression or otoplastic being inserted in the ear 24 of a patient so that there is a connection to the auditory passage due to the tube going through the ear impression or otoplastic. The volume of the pressure chamber 20 is approximately 50 times the volume of the cavity in the ear between otoplastic and ear drum, and the displacement of the piston pump 22 is approximately the same as the volume of the inner ear space. Consequently, one stroke of the piston 25 along the distance "a" will compress the air volume in the pressure chamber in the ratio of the size of the air volume of an average auditory passage.

A piston 26 can be pushed into the pressure chamber 20 to decrease the volume of the pressure chamber in accordance with the location of the measuring device over sea level so that the atmospheric pressure should not affect the test result. The piston 26 is adjusted when the device is put into operation by closing the tube 23 tightly and adjusting the piston 26 so that at the end of one stroke of the piston 25 of pump 22 the measuring instrument indicates that the system is tight.

Figure 3:
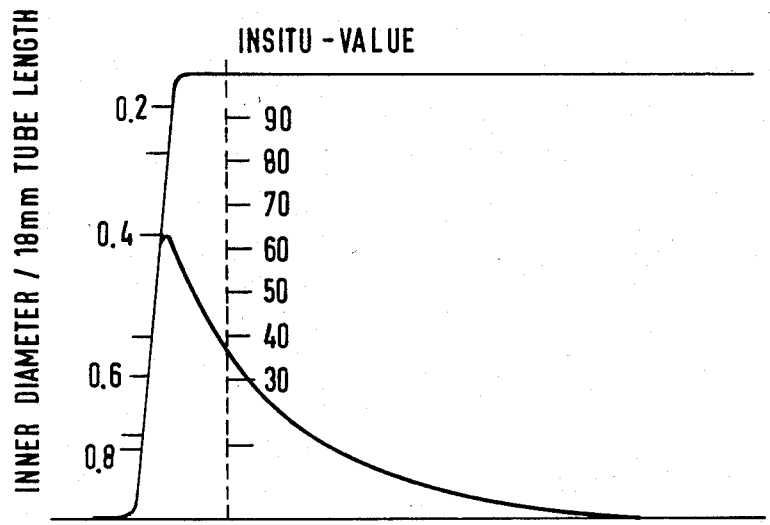
FIG. 3 shows a typical curve which is provided by the measuring instrument in which may be provided on a test card.
Figure 2:
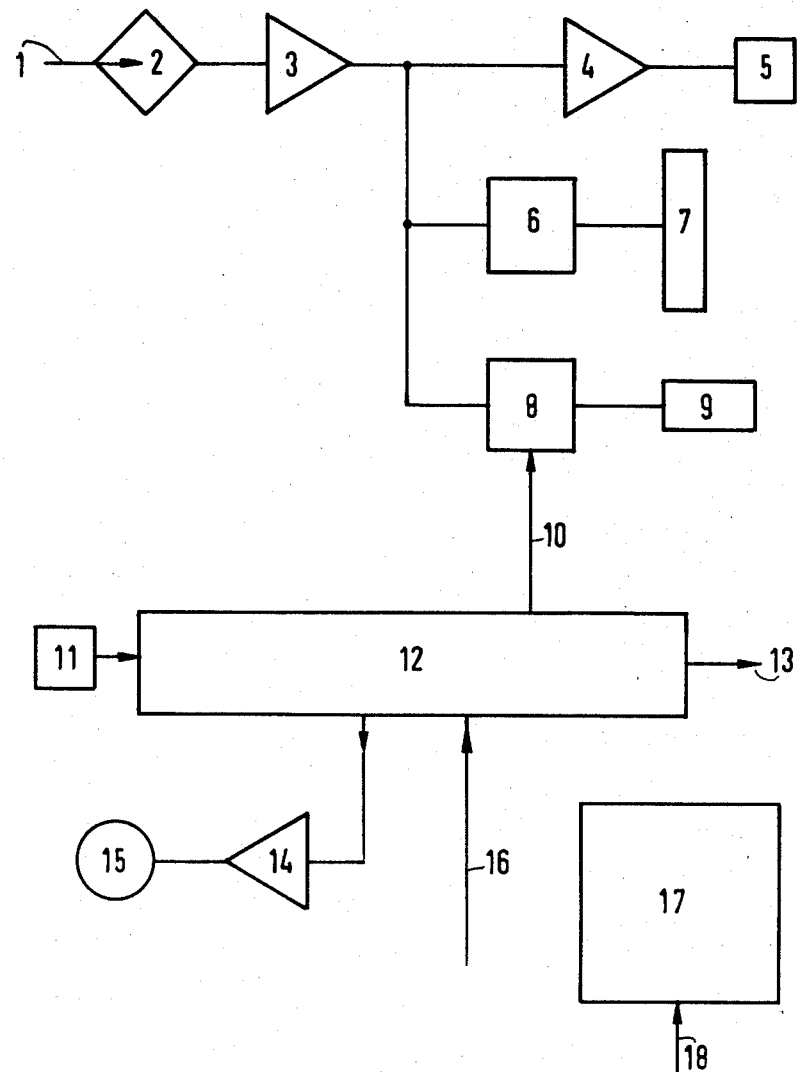
FIG. 2 is a block circuit diagram of the measuring device.

Connected to the pressure chamber 20 via a line 1 is the measuring and indicating device shown in FIG. 2. Line 1 goes to a pressure sensor 2 which converts the pressure changes occurring in the pressure chamber 20 into an electric voltage which is amplified in an amplifier 3 and fed to a recording measuring instrument 5 via a driver/buffer 4. A control circuit 12 ensures that the pumping and measuring process takes place within a preset time frame, the starting signal being triggered by a foot switch not shown, via a line 16. With triggering of the starting signal a motor 15 driving the piston 25 of pump 22 is started via a driver/amplifier 14 so that the piston 25 carries out one stroke. A sensor 11 determines the position of piston 25, the control circuit 12 ensuring that the piston always assumes its starting position at the start of a measuring operation. An output line 13 of the control circuit 12 operates the recording measuring instrument 5 at the same time it starts the motor 15; the pressure curve of the system being plotted over time by the recording instrument. The test card shown in FIG. 3 is inserted in the measuring instrument for this purpose, the test card being designed specifically for the measuring instrument and containing a given curve which corresponds to the pressure time curve when pressure starts building up with the turn on of the pump 22, the ideal case being the case in which the preset overpressure is built up and maintained after one stroke of the piston 25, in other words, a case in which the ear impression or otoplastic seals the auditory passage absolutely tight. The steepness or slope of the curve is provided by the control unit 11 which determines the speed of piston 25 and the feed rate of the recording instrument 5. The stylus thus intersects this rising flank of the curve at every measurement, whereby, depending on the tightness of the ear impression or otoplastic, the flank maximum shown in the test card may or may not be reached. Based on the parameters of the pressure generator and on the fact that the average tube length of an otoplastic is 18 mm, the rising flank of the curve can be calibrated so that it indicates directly to which diameter, in fractions of a millimeter, a leak corresponds. The range of the scale runs, for example, from 1 mm at the base to zero at the maximum so that an immediate evaluation can be made as to the size of the leak and whether it is worthwhile to eliminate this leak. The location of the leak can be made visible by using a liquid as disclosed in German patent application DE-OS No. 2 941 817.5. Within a preset time span after the piston 25 of pump 22 has concluded its motion, the test card contains an evaluation figure numbered from 0 to 100 in ordinate direction, the number 100 corresponding to the ideal situation in which the pressure, even after a preset time span of 0.7 sec., for example, has not dropped. By way of example, a test curve has been drawn in the test card, indicating that there is a leak corresponding to a 0.4 mm diameter and that, at the time of the second measured value, the pressure has dropped to 35% of its nominal value. The specialist recognizes from this curve that, in the case of an ear impression, the result obtained is still adequate and that a new ear impression need not to be made.

The indicating device does not have to be a recording instrument. As shown in FIG. 2, as an alternative or in addition, there may be connected to the amplifier 3 a converter system 6 which converts the analog values of the pressure sensor 2 so that the actual pressure is indicated in a suitable numerical scale by a LED display 7. It is also possible to connect to the amplifier 3, alternatively or additionally, an analog/digital converter 8 which is driven by the control circuit 12 via a line 10 and indicates, in a digital display 9 in numbers from 1 to 100, the pressure drop in percentage points corresponding to the second value measured by the recording instrument in FIG. 3.

The pump 22 also contains a vent 27, by means of which the system can be vented. This occurs automatically in the ready position, into which the control circuit 12 resets the measuring instruments upon the conclusion of a measurement. By actuating the foot switch the operator can also interrupt the measurement and return the instrument into its ready position, in which a new test can be started from the beginning.

For power, the test circuit according to FIG. 3 also contains a power supply 17 which is connected to a power line via a line 18.

FIGS. 4 through 9 show the output and input signals of control circuit 12. A starting signal (FIG. 4) is fed to control circuit 12 by the foot switch via line 16 (FIG. 4) at T1. At this time control circuit 12 closes vent 27 (FIG. 5). At the same time, control circuit 12 provides a signal at output 13 which starts the paper motor of instrument 5 (FIG. 6). After a predetermined time interval t1 a signal at T2 starts the motor 15 (FIG. 7) which moves the piston from its starting position to the right. This motor is switched off at T3 when piston 25 reaches its end position in which the volume of pump 22 has its minimum. Time T3 is determined by sensor 11 (FIG. 8). After a preset time interval t2 digital display 9 is activated via a sample and hold circuit in converter 8 for displaying the pressure (FIG. 9).

The paper motor of instrument 5 is switched off after a preset time delay t3 (FIG. 6). At T5 a reset signal is fed by the foot switch (FIG. 4) to control circuit 12 which causes motor 15 to move piston 15 back into its initial position which is reached at T6 (FIGS. 7, 8). Furthermore at T5 vent 27 is opened again (FIG. 5) and display 9 is reset (FIG. 9).

FIG. 10 shows the components 8, 11, 12, 14, 15, 27 and their connection with the components of control circuit 12. It can be seen, that control circuit 12 comprises logic circuits and time delay stages.

There has thus been shown and described novel apparatus for testing the fit and tightness of hearing aid related devices which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a measuring device for checking the tightness of an ear impression mold which serves as a pattern for the manufacture of an otoplastic and of an otoplastic which is insertable in the auditory passage of an ear wherein by means of said device an air pressure prevailing on the outside can be produced, via an air permeable connection, in an inner space defined by the ear drum and the ear impression mold and otoplastic and through which changes in a generated deviating air pressure can be measured, the improvement comprising:
   (a) a pump connected to said air permeable connection which serves for the generation of said deviating air pressure via a pressure chamber with a volume which is a multiple of the volume of said inner ear space; and
   (b) a control circuit for presetting the timing of pumping and measuring functions provided therethrough.

2. The measuring device according to claim 1, wherein said pump is a piston pump with a displacement corresponding approximately to the volume of said inner space and wherein the volume of said pressure chamber is approximately 20 to 100 times the volume of said inner space.

3. The measuring device according to claim 1, wherein said pump is a piston pump whose displacement corresponds approximately to the volume of said inner space and wherein the volume of the pressure chamber is 50 times the volume of said inner space.

4. The measuring device according to claim 2, wherein the volume of said pressure chamber is adjustable in adaptation to the atmospheric pressure at a measuring site.

5. The measuring device according to claim 4, wherein said device includes a piston which is slidable into said pressure chamber for adjusting the volume of said pressure chamber.

6. The measuring device according to claims 1, 2, 3, 4 or 5, wherein with triggering of a pumping function the control circuit drives a recording measuring instrument which plots the instantaneous pressure over time for each piston stroke, said instrument providing a maximum value which is a measure of the diameter of an air leak and a second value corresponding to a preset later point in time, which is a measure of pressure then still remaining, in a scale from 100 to zero, 100 corresponding to a state of complete tightness.

7. The measuring device according to claim 6, wherein said recording measuring instrument comprises an analog indicating device for generating said maximum value and a digital display for generating said second value.

8. The measuring device according to claim 7, wherein said analog indicating device comprises a group of LED elements arranged in a column.

* * * * *